US005626803A

United States Patent [19]

Siegemund

[11] Patent Number: 5,626,803

[45] Date of Patent: May 6, 1997

[54] PROCESS FOR ECONOMICAL MANUFACTURE OF BRUSHES OF PREDETERMINED ANISOTROPY

[75] Inventor: Horst Siegemund, Schmitten/Taunus, Germany

[73] Assignee: Deutsche Carbone AG, Frankfurt am Main, Germany

[21] Appl. No.: 360,302

[22] Filed: Dec. 21, 1994

[30] Foreign Application Priority Data

Dec. 23, 1993 [FR] France .................................. 93 15769

[51] Int. Cl.$^{6}$ .................................................. C04B 35/00

[52] U.S. Cl. .......................... 264/40.5; 264/104; 264/105

[58] Field of Search .................................. 264/40.5, 104, 264/105, 259

[56] References Cited

U.S. PATENT DOCUMENTS

| | | | |
|---|---|---|---|
| 2,310,108 | 2/1943 | Moberly | 171/325 |
| 3,906,624 | 9/1975 | Ohta | 29/630 E |

FOREIGN PATENT DOCUMENTS

| | | |
|---|---|---|
| 2690791 | 11/1993 | France . |
| 123712 | 6/1900 | Germany . |
| 2038565 | 7/1980 | United Kingdom . |

*Primary Examiner*—Christopher A. Fiorilla

*Attorney, Agent, or Firm*—Dennison, Meserole, Pollack & Scheiner

[57] ABSTRACT

A process for manufacturing brushes for electric motors utilizing a female die with two sheaths intersecting at 90° from each other, one sheath vertical and the other sheath horizontal, and each sheath provided with at least one male die and forming a compression cavity. A batch of conductive powder is introduced into the cavity, and a first compression is performed under displacement control using compression means of one of the two sheaths so as to obtain an intermediate tubular cavity having the cross section of the other sheath. A second compression is then performed under pressure control using the compression means of the other sheath so as to obtain a crude brush of final volume at a desired final compression rate. The compression means of each of the sheaths is moved apart, first those under pressure control and then those under displacement control, and the crude brush is ejected.

7 Claims, 10 Drawing Sheets

FIG.3
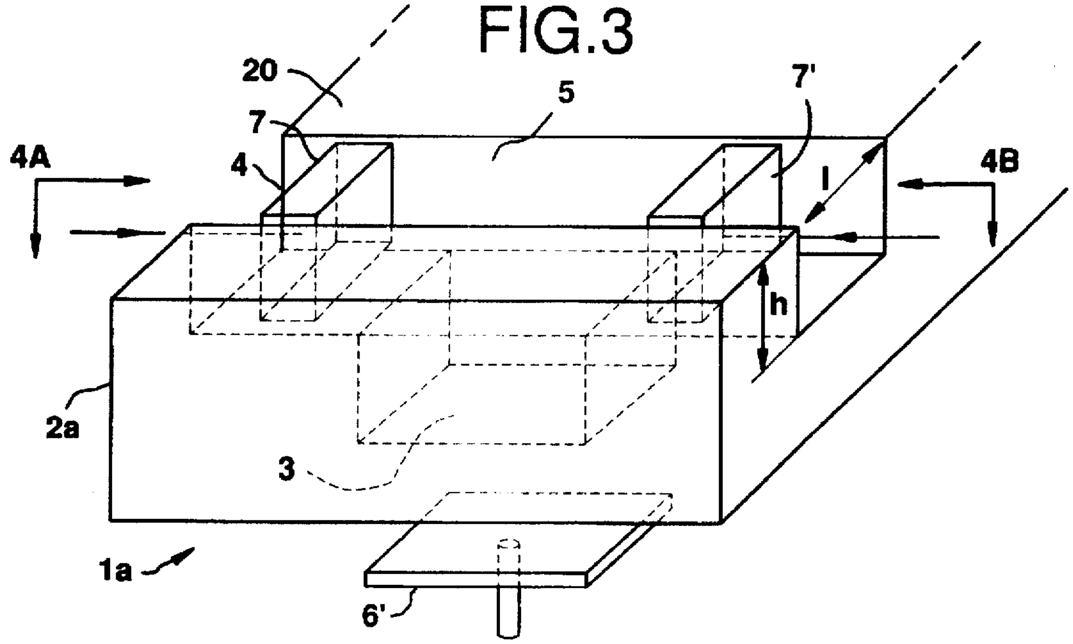
FIG.4A
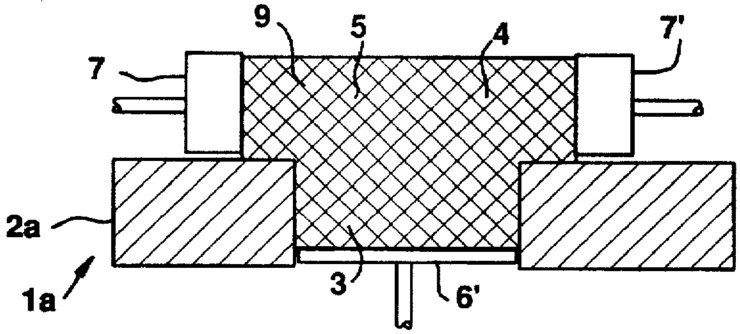
FIG.4B
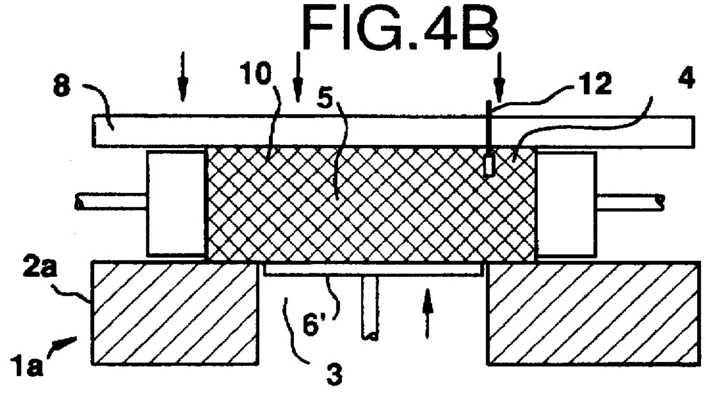
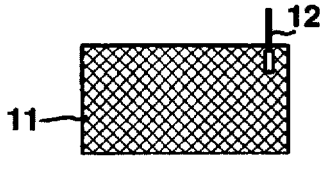
FIG.4C

FIG.11A
FIG.11B
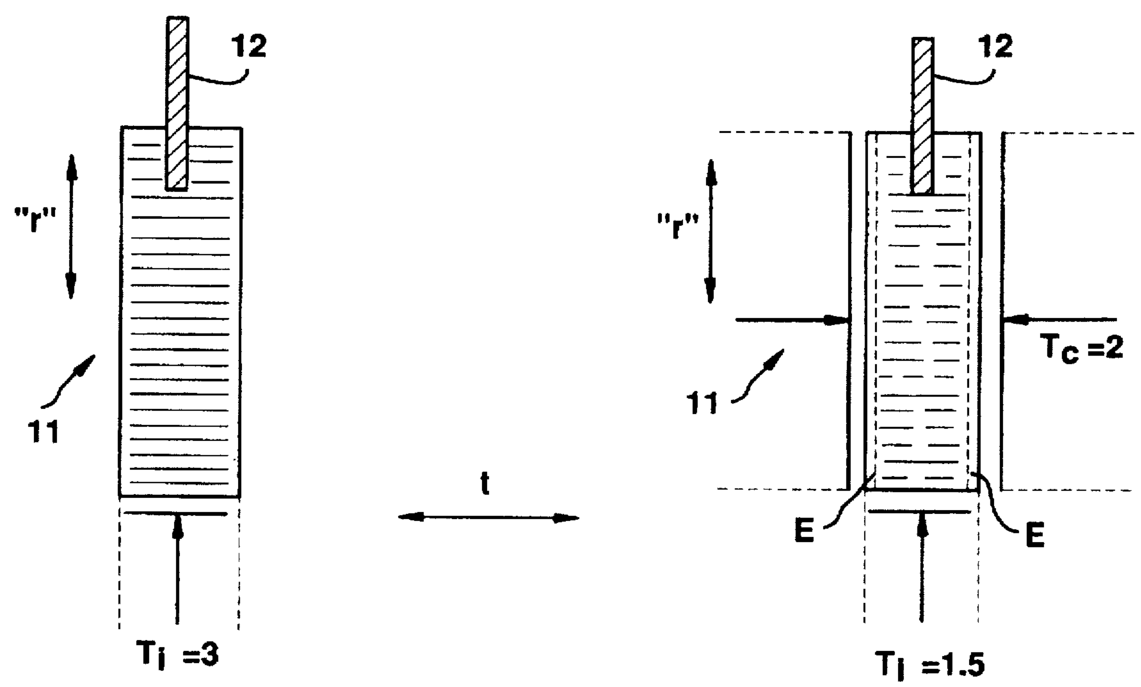
FIG.12
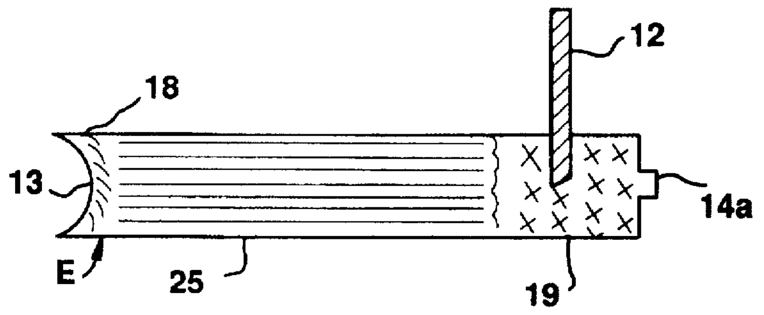

PROCESS FOR ECONOMICAL MANUFACTURE OF BRUSHES OF PREDETERMINED ANISOTROPY

FIELD OF THE INVENTION

The invention relates to the manufacture of brushes for electric motors, and more particularly to an apparatus and method for economical manufacture of brushes of predetermined anisotropy using this apparatus.

More specifically, the invention relates to direct manufacture of brushes, that is, shaping them by compression of conductive powders, that does not require final machining of the brush either for making it the desired size or for mounting the electric connection conductor, a method by which direct manufacture brushes of a predetermined anisotropy can be obtained.

DESCRIPTION OF RELATED ART

It is known that the anisotropy of a brush is an essential parameter that determines its performance in use. It originates in the fact that brushes are generally made by compression of powders, some of which may have very high form factors ("largest size/smallest size" ratio), for example, graphite particles of small thickness e (5 to 20 μm) and great length or width (100 to 200 μm).

The result is a certain orientation of the particles with a form factor significantly different from 1, and hence, there is anisotropy in both the electrical and the tribological properties, where the particles with a high form factor are oriented, during the compression step, in such a way that the axis of compression is on average parallel to the smallest dimension e of these particles (or perpendicular to the plane defined by the largest sizes).

Generally, although this is not true in all cases, the brush is oriented relative to the collector in such a way that the direction of brush compression is the direction "L" at a tangent to the collector of the motor. Hence, both minimum wear and good commutation of the brush are obtained.

The tangential direction "t", like the other directions axial "a" and radial "r", is relative to the collector (see FIG. 8*f*).

In French Patent Application No. 93-10881, a means was proposed for obtaining multilayer brushes capable of performing multiple functions, especially high-quality commutation. In that application, at least two different powders are simultaneously introduced into the compression mold.

In addition, in French Patent Application No. 93-06962, a means is proposed for obtaining brushes directly with their final dimensions at the end of the step of compressing conductive powders. The method described in that application makes use of a selection of graphite powders.

In those patent applications, as in the majority of references relating to brush manufacture, one example being French Patent 2,009,196, the compression of the conductive powders is a uniaxial compression of two powders introduced successively into a female die acting as the compression mold.

The Applicant has conducted its research so that the following can be obtained simultaneously:

First, brushes directly with the final dimensions at the end of a single compression step, but without being limited to a choice of starting materials as in French Patent Application No. 93-06962. The term "final dimensions" is understood to mean the critical dimensions of the brush, that is, those in the directions "a" and "t", the dimensions that make up the cross section of the brush, which is understood to be an object meant to slide within its brush holder of predetermined, fixed cross section, unlike the direction "r" which does not require such great dimensional precision.

Second, brushes that have the desired anisotropy, taking into account both their positioning on the collector and the type of motors and applications, without having to have recourse to the technology of multilayer brushes as described in French Patent Application No. 93-10881, Finally, brushes whose head and foot have a shape adapted to the chosen use, without being machined after compression. The end of the brush carrying the electrical connection conductor (generally a copper braid) is called the "head", and the end of the brush in contact with the collector is called the "foot".

Typically, it is preferable for the foot of the brush to have at least the same curvature as the collector, unless additional means are provided, to facilitate the running-in of the motor. Moreover, it is often necessary for the head of the brush to be provided with some means, typically a stub, notch or rib, so that the spring resting on the head will remain properly centered and will not threaten to shift laterally out of place—which is one reason for machining of the head in the prior art methods.

SUMMARY OF THE INVENTION

In a first object of the invention, an apparatus is provided for manufacturing brushes including a female die provided with a cavity intended to receive at least one conductive powder to be compressed and at least one male compression die for compressing the powder, and is characterized in that the female die is provided with two intersecting sheaths forming the cavity and oriented at 90° with respect to one another, one of them being oriented along the vertical and the other along the horizontal, and that each of these sheaths is provided with compression means, including at least one male compression die, in such a manner as to obtain the biaxial compression of the powder.

The apparatus used industrially in the prior art are typically made up of a vertical sheath provided with two male dies, a lower male die that with the vertical sheath forms a cavity that is then filled, by the upper free orifice, with at least one conductive powder. Uniaxial compression between male dies, as already indicated, leads to the formation of an anisotropic brush of what is known as "laminar" structure, which is profitably employed to improve commutation.

With this apparatus, it is impossible by compression to obtain an crude brush provided with a desired geometrical configuration at its head and/or its foot (that is, a stub for centering for the head, a curvature for the foot, etc.), and further having a favorable orientation of its laminar structure. In fact, the compression with the male dies that makes it possible to imprint upon the conductive powder the desired geometrical configuration requires a direction of compression parallel to the direction "r"—and not to the direction "t" as is required if improved commutation is to be obtained. Consequently, in the prior art, this geometrical configuration of the head and foot were obtained by an additional machining operation.

As will become clearly apparent from the description below, the biaxial compression apparatus according to the invention conversely makes it possible to obtain both the favorably oriented laminar structure and any geometrical configuration that may be desired for the head and foot of the brush; a typical configuration of the foot is one that is adapted to the configuration of the collector.

Numerous tests made by the Applicant have in fact shown that it is possible, with biaxial compression using the apparatus of the invention, to obtain a brush with pronounced anisotropy and with a very pronounced laminar structure, on the condition that:

a) first, the compression means are employed sequentially (employment of compression means in one direction—first, by convention, a compression in the vertical direction and then by a second compression in the other direction, that is, the horizontal direction);

b) and second, the rate Ti of first compression (also called initial compression rate) in one direction and the rate Tc of second compression (also called complementary compression rate) in the other direction are relatively different (typically Ti/Tc>2, or Tc/Ti>2).

Under these conditions, the Applicant has observed, in the case where Ti/Tc>2, a phenomenon that is especially interesting in practice, that is, that the laminar structure of the compressed powder obtained after the first compression (conventionally vertical) is only slightly perturbed by the second compression in the other (horizontal) direction, except at the ends of the brush, that is, the only parts in contact with the male compression dies during the second compression, parts whose laminar structure undergoes complete modification (local reorientation of particles taking into account the direction of the second compression—which is 90° from the first compression).

Thus, providing these two conditions are met, a second compression does not essentially destroy the orientation effects obtained after a first compression.

As to the alteration of the anisotropy at the ends of the brush during the second compression, not only is there no deleterious effect but it will be even more advantageous:

for the head, which, as will be described below becomes denser and is reinforced;

and for the foot, which because of the change in orientation of the flat particles, has a coefficient of friction that is slightly lower, which is favorable to the running-in of the brush-collector pair.

In addition, at the end of this running-in phase and following wear of the brush during that phase, the active surface of the brush in contact with the collector has a laminar structure that is already quite close to that which is optimal for commutation of the central part of the brush.

It will be appreciated that depending on the particular cases encountered and on the set of relative compressions in one direction and the other, a more or less major and regular anisotropy can be obtained, particularly if the two conditions defined above are not met.

In summary, the biaxial compression apparatus according to the invention makes it possible, directly by compression of conductive powder, to obtain an crude brush whose head and/or foot has a desired geometrical configuration, while preserving the desired orientation of its laminar structure. Typically, the laminar structure desired is obtained during the first compression, while the desired geometrical configuration is obtained during the second compression.

Numerous variations of the apparatus according to the invention will become apparent from the ensuing description of the apparatus and the description of the method using this apparatus, and from the drawing figures and their description.

BRIEF DESCRIPTION OF THE DRAWINGS

FIG. 3 is schematic perspective drawing of a first variation of the apparatus of the invention;

FIGS. 4*a* and 4*b* are vertical cross-sectional views of the apparatus of FIG. 3 along the axis A-B, showing the sequence of steps of the invention;

FIG. 4*c* is a cross-sectional view of a finished brush;

FIGS. 11*a* and 11*b* are views of a brush of Example 2;

FIG. 12 is a cross-sectional view of a brush of Example 3;

DESCRIPTION OF THE PREFERRED EMBODIMENTS

Figure 1:
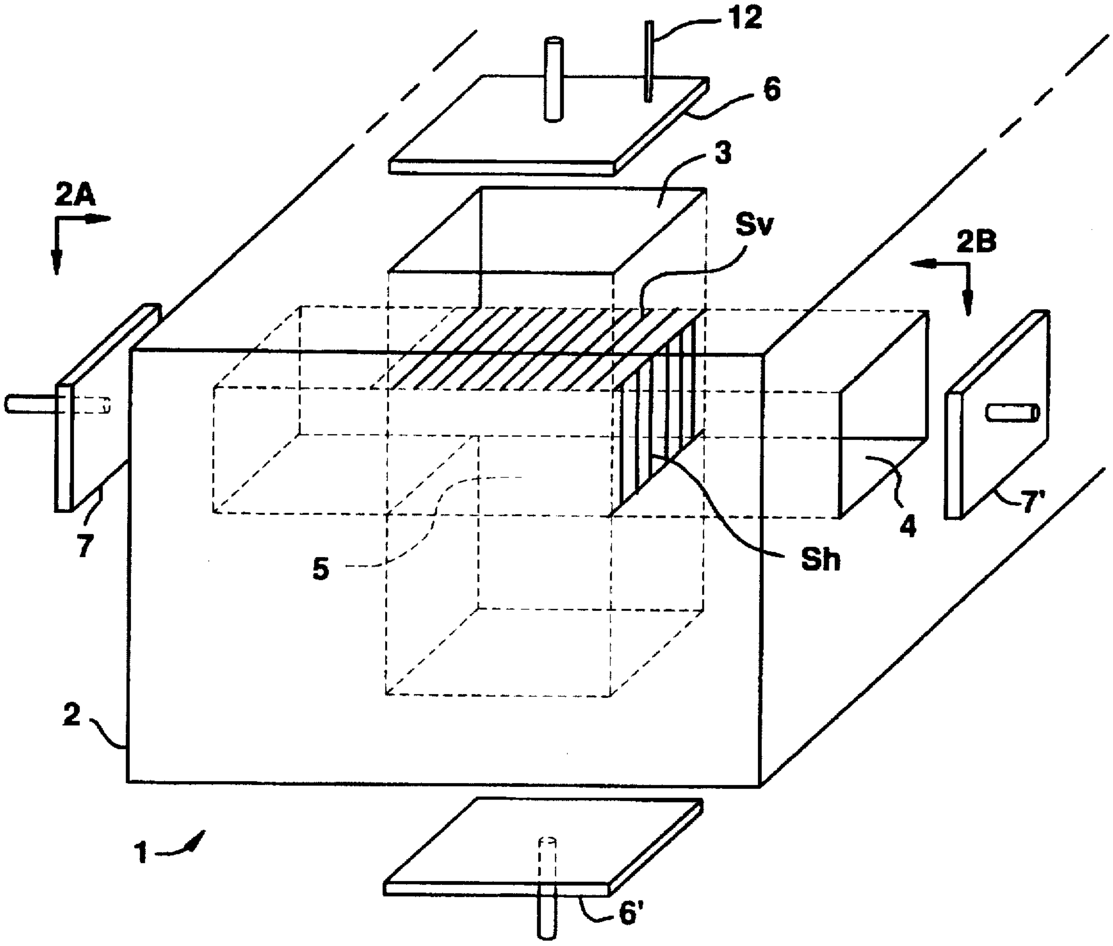
FIG. 1 is a schematic perspective drawing of a biaxial compression apparatus according to the invention.

FIG. 1 shows schematically a perspective view of a biaxial compression apparatus (1) according to the invention. This apparatus (1) includes a female die (2) in which two intersecting sheaths, that is, one vertical sheath (3) of cross section Sv (shaded obliquely) and one horizontal sheath (4) of cross section Sh (vertical shading) intersect at 90°, forming a common intersection space (5) of parallelepiped form.

The vertical sheath is provided with two male dies: an upper male die (6) and a lower male die (6').

The horizontal sheath is provided with two male dies: a left-hand male die (7) and a right-hand male die (7').

In this drawing, as in the following drawings, the means known to the art for actuating the various male dies (6, 6', 7 and 7') are not shown.

FIGS. 2*a*–2*d* illustrate, in different steps, the function of the apparatus (1) and show a section in the vertical plane taken along the axis (A-B) of FIG. 1.

Figure 2A:
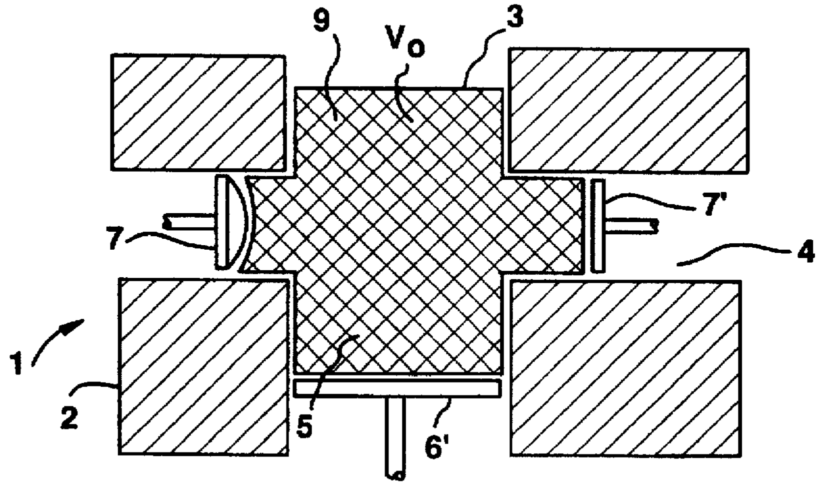
FIGS. 2*a*–2*d* are vertical cross-sectional views of the apparatus of FIG. 1 along the axis A-B, showing the sequence of steps of the invention.

In FIG. 2*a*, the upper male die (6) has been removed, with the other male dies positioned to form a cavity that has been filled with conductive powder to be compressed (9), and whose volume is Vo. It should be noted that the left-hand male die (7) has a curved profile.

Figure 2B:
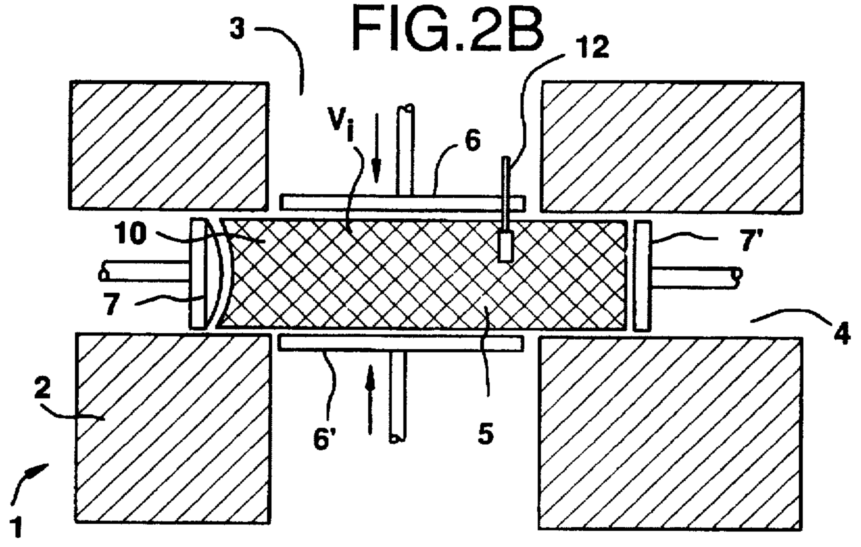

FIG. 2*b* shows the first compression step, in the vertical direction, with the aid of the upper (6) and lower (6') male dies. It should be noted that at the end of this first compression, which has converted a volume Vo of conductive powder (9) into a volume Vi of compressed powder (10), the compressed powder (10) occupies only the space of the horizontal sheath (4) and forms a block of cross section Sh. One may also note the presence in the upper male die (6)

of a conductor (12) whose end, after vertical compression, penetrates the compressed powder (10).

Figure 2C:
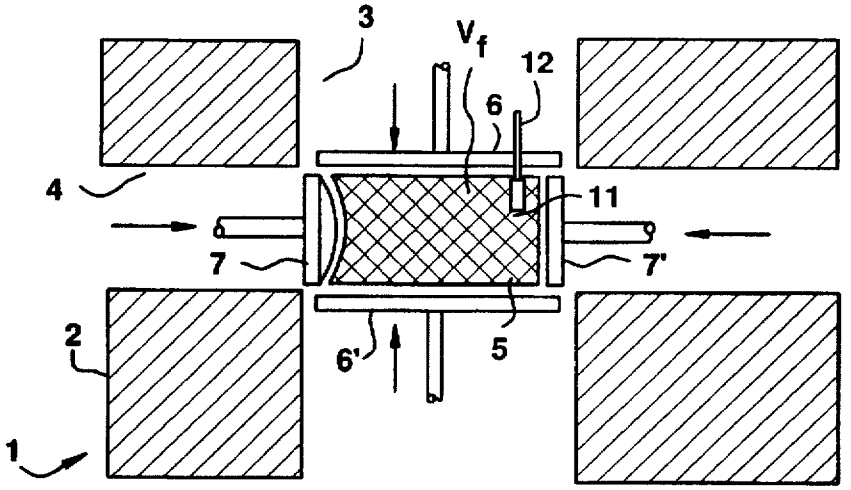

FIG. 2*c* shows the compression step, in the horizontal direction with the aid of the left-hand (7) and right-hand (7') male dies, which leads to the final shaping of an crude brush (11) of volume Vf.

Figure 2D:
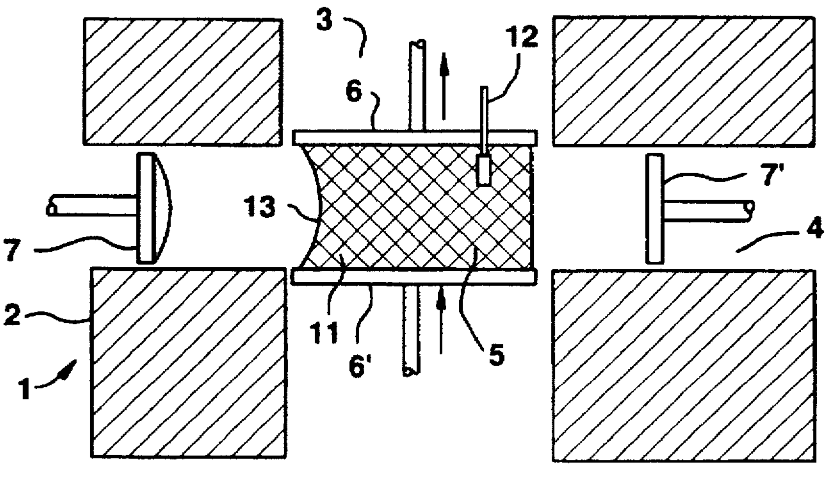

FIG. 2*d* shows the next step, in the course of which the horizontal male dies (7) and (7') are moved apart, in such a way as to enable the recovery of the crude brush (11)—after the vertical male dies (6) and (6') are raised and after the upper male die (6) is moved away (not shown in FIG. 2*d*).

FIG. 3 shows a schematic perspective view of a first variant (1*a*) of the apparatus (1) of the invention. In this three-male die device (1*a*), shown in the "open" position—ready to receive a batch of conductive powder—the vertical sheath (3) of cross section Sv and the horizontal sheath (4) of cross section Sh intersect at 90°, forming a T, instead of forming a cross as in FIG. 1.

FIGS. 4*a*–4*b* are sections in the vertical plane taken along the axis (A-B) of FIG. 4.

In FIG. 4*a*, similar to FIG. 2*a*, the horizontal male dies (7) and (7') and the vertical lower male die (6') are positioned to form a cavity that has been filled with conductive powder (9) to be compressed, and whose volume is Vo.

FIG. 4*b*, similar to FIG. 2*b*, shows the first compression step, in the vertical direction with the aid of the lower male die (6'), after a plate (8) has been placed on the upper plane (20) of the female die (2*a*) and held in that position by means not shown.

As in the case of FIG. 2*b*, at the end of the first, vertical compression a block of compressed powder (10) is obtained which has the same cross section Sh as the horizontal sheath (4).

It should be noted that the conductor (12) has been introduced into the powder (9) to be compressed by providing the plate (8) with an orifice into which one end of the conductor (12) is introduced.

FIG. 4*c* shows a section through the final crude brush (11).

Figure 5A:
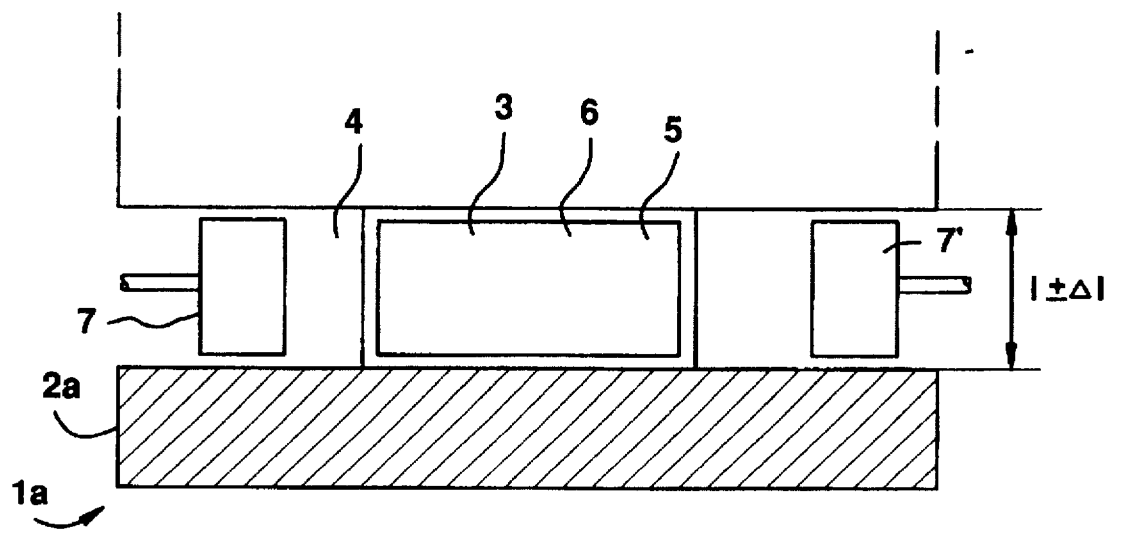
FIG. 5*a* is a plan view of the apparatus of FIG. 3

FIG. 5*a* is the plan view of the apparatus of FIG. 3 that illustrates the fact that the horizontal sheath (4) is formed by precision machining, in such a way as to assure a width (1) with high precision (Δ1 less than 0.02 mm, and preferably less than 0.01 mm).

Figure 5B:
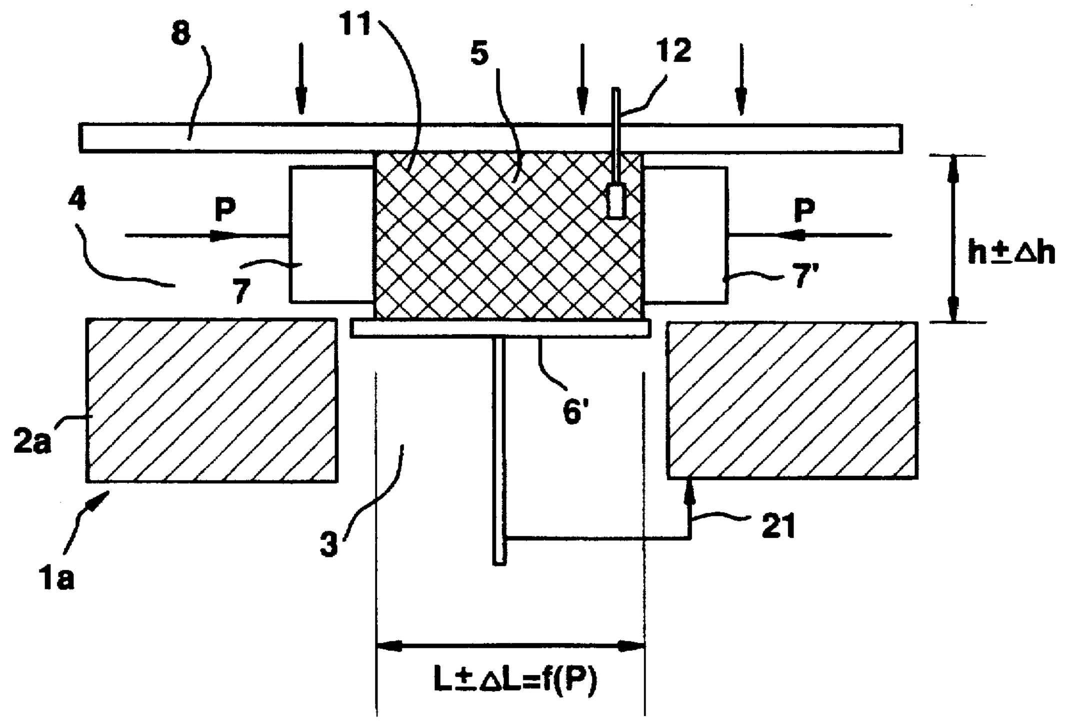
FIG. 5*b* illustrates a preferred mode of the apparatus of FIG. 5*a;*

FIG. 5*b*, which completes FIG. 5*a*, illustrates a preferred mode of the invention, in which:

a) the three-male die apparatus (1*a*) is used with the plate (8) wedged and compressed against the upper surface (20) of the female die (2*a*);

b) during the first compression, the vertical lower male die (6') stops its travel when it arrives precisely at the level of the horizontal sheath (4)—this has been represented symbolically by a stop (21), such that this apparatus for the crude brush (11) guarantees a precise and reproducible height h (Δh is less than 0.02 mm, and preferably less than 0.01 mm);

c) conversely, the second compression is controlled by the pressure (the male dies are stopped at a pressure equal to a given pressure). Under those conditions, the precision of the length (ΔL/L) is good, but not as great as the precision of the cross section (l•h) of the crude brush (11).

This precision in L is nevertheless sufficient in practice, given the fact that this dimension is also the length of the brush, since the dimensional requirements are much less for the length of the brush than for its cross section.

Figure 6:
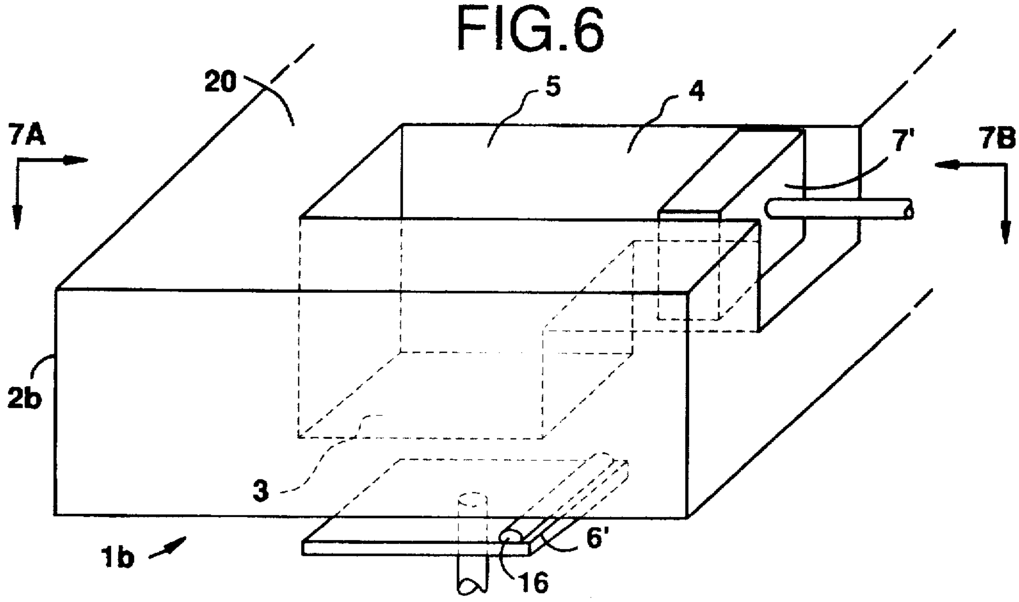
FIG. 6 is a schematic perspective view of a second variation of the invention.

FIG. 6 shows a second embodiment (1*b*) of the apparatus (1), similar to FIGS. 1 and 3. In this two-male die apparatus (1*b*), the vertical sheath (3) and the horizontal sheath (4) take the form of an L.

In order to form a groove on the crude brush, the vertical lower male die (6') has been locally provided with an excess crosswise thickness (16).

Figure 7A:
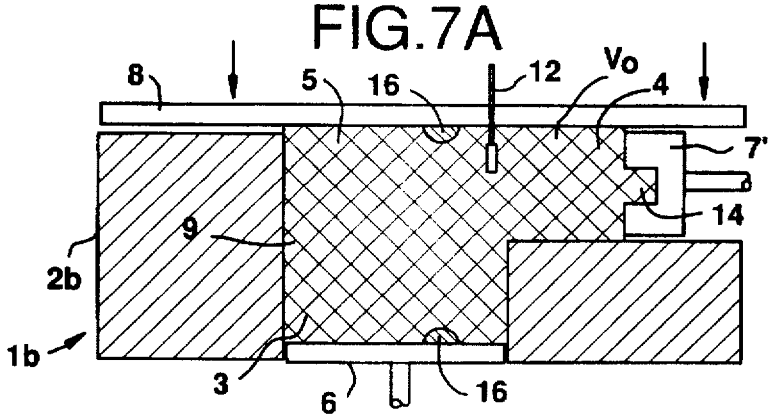
FIG. 7*a* and 7*b* are vertical cross-sectional views of the apparatus of FIG. 6 along axis A-B, showing the sequence of steps of the invention.
Figure 7B:
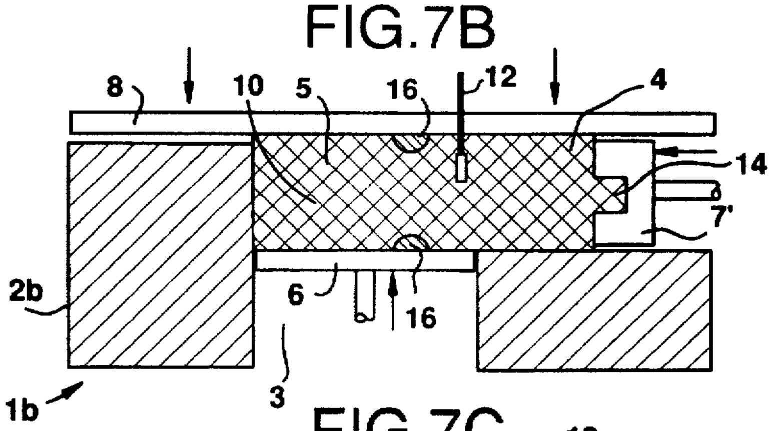
Figure 7C:
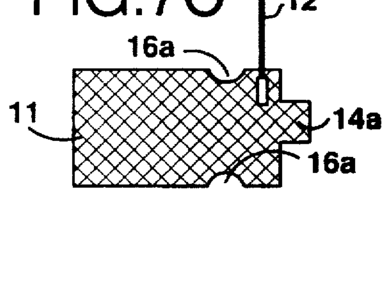
FIG. 7*c* is a cross-sectional view of a finished brush.

FIGS. 7*a*–7*c*, similar to FIGS. 4*a*–4*c*, are sections in a vertical plane along the axis (A-B) of FIG. 6.

In FIGS. 7*a*, similar to FIG. 4*a*, the horizontal male die (7'), which includes a hollow portion (14), and the vertical lower male die (6') are positioned to form a cavity that has been filled with conductive powder (9) to be compressed, and whose useful volume is Vo.

Both the vertical lower male die (6') and the upper plate (8) are provided with an excess crosswise thickness (16).

FIG. 7*b* shows the apparatus (1*b*) at the end of the first, vertical compression.

FIG. 7*c* shows the crude brush (11) obtained with two lateral grooves (16*a*) and one stub (14*a*).

FIGS. 8*a*–8*f* represent variants of the crude brushes (11), in cross section along the plane "r-t", which are obtained by the invention. These variants, explicit in themselves, relate to the geometrical configuration (FIGS. 8*a*, 8*b*, 8*c* and 8*d*).

In all these brushes, the horizontal shading represents the laminar structure. The structure of the ends has not been shown explicitly, except in FIG. 8*e* (end of the foot (18) in "widely spaced" crosshatching; end of the head (19) in "closely spaced" crosshatching), where the ends (18) and (19) have a laminar structure that is rather oriented in the second compression.

Figure 8A:
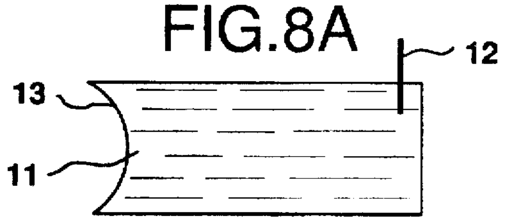
FIGS. 8*a*–8*f* are cross-sectional views along the plane "r-t" of crude brushes according to the invention.
Figure 8B:
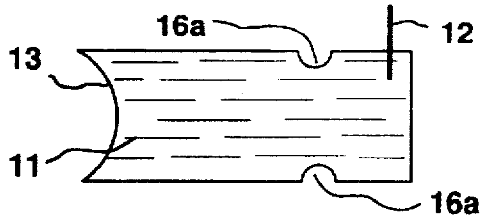
Figure 8C:
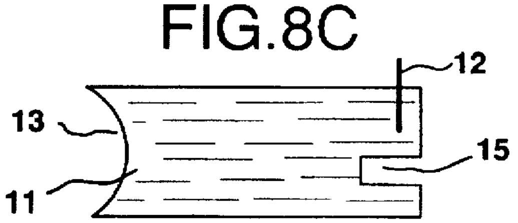

It will be appreciated that in reality, the change in the laminar structure between the ends and the central part of the brush is not as sudden as is shown in FIG. 8*c*.

Figure 8D:
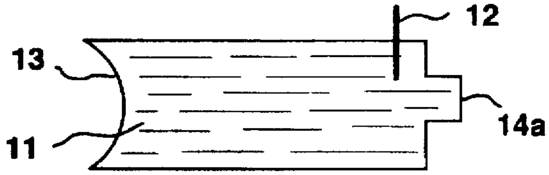
Figure 8E:
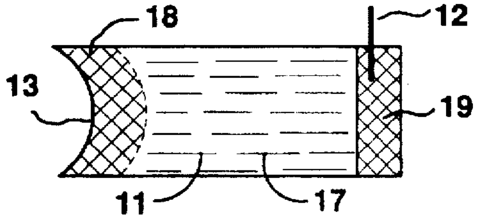
Figure 8F:
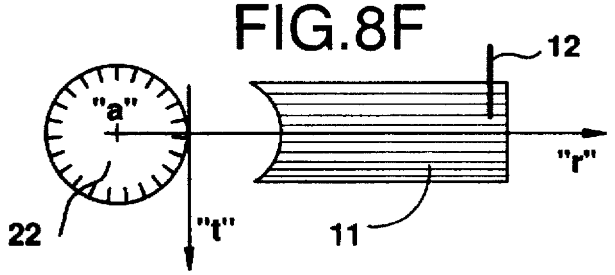
Figure 9A:
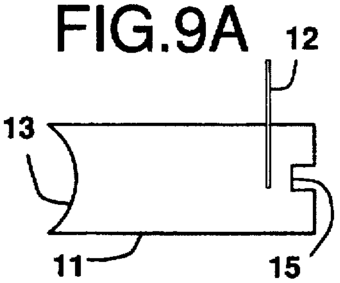
FIGS. 9*a* 9*d* are views of a brush according to Example 1.
Figure 9B:
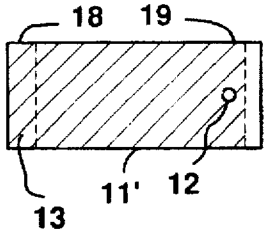
Figure 9C:
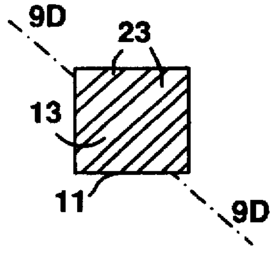
Figure 9D:

FIG. 8*f* shows the directions "a", "r" and "t" relative to the collector (22).

FIGS. 9 and 10*a*–10*c* relates to the brushes of Example 1.

FIG. 9 shows various views of the brushes of Example 1:

a sectional view in the plane "r-t" is shown at (a), a plan view in the plane "a-r", is shown at (b), a view of the contact surface (13) forming the foot (18) and provided with oblique grooves (23), is shown at (c), and the relief of the surface (13) is shown, along the axis (A-B) of FIG. (c), at (d).

Figure 10A:
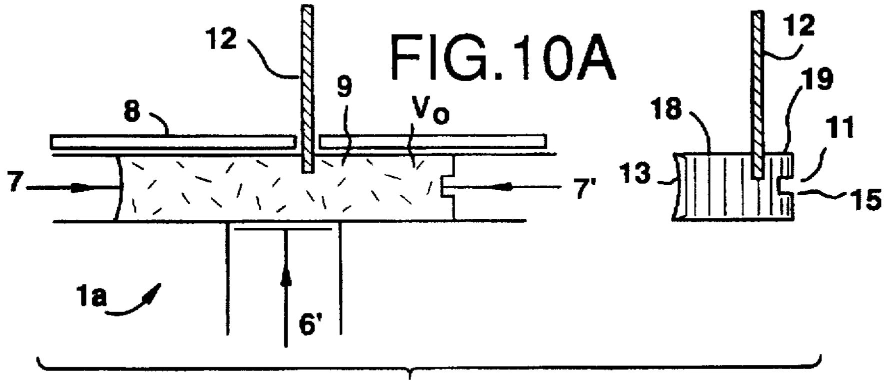
FIGS. 10*a*–10*c* show the apparatus used in Example 1.

FIG. 10*a* shows a biaxial compression apparatus (1*a*) according to the invention, used for monoaxial compression (horizontal male dies 7 and 7') in the initial state, to obtain an crude brush according to the prior art, with the batch of powder (9) of volume Vo not yet having begun to be compressed, and with the vertical male die (6') being kept raised for the entire compression; and, in section along the plane "r-t", it shows the crude brush obtained, for which lines have been schematically drawn showing the orientation of the particles after compression.

Figure 10B:
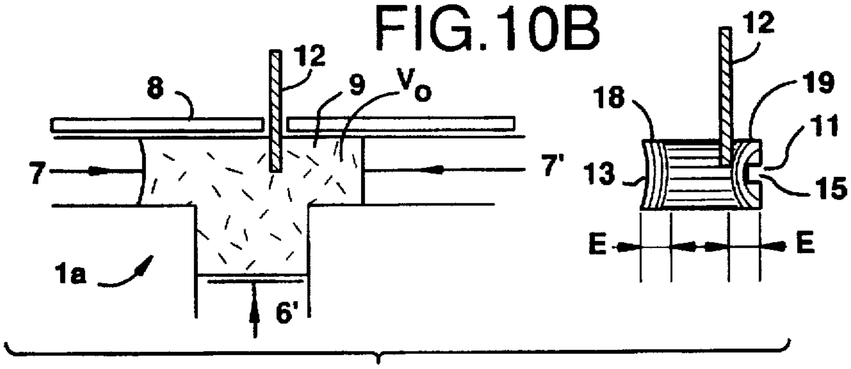
Figure 10C:
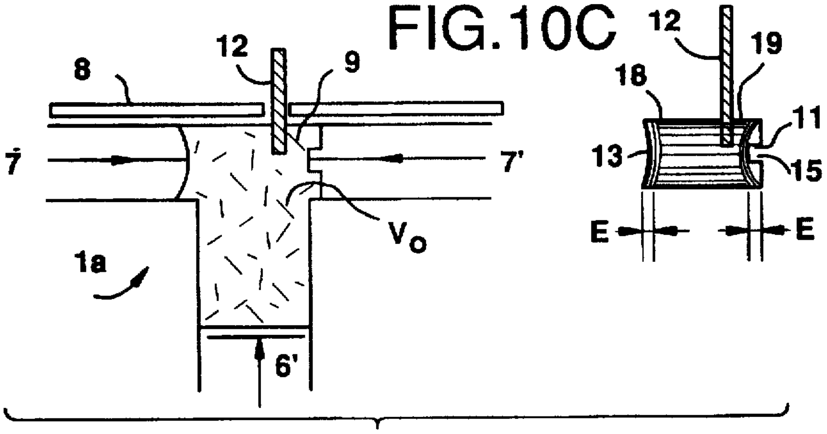

FIGS. 10*b* and 10*c*, similar to FIG. 10*a*, correspond to the tests 1*b* and 1*c*, respectively. The two crude brushes obtained have a "core" made up of particles favorably oriented along the plane "a-r" (orientation obtained during the first, vertical compression with the male die (6')), and two ends of desired geometrical shape, at the head (19) and the foot (18), made up of layer of thickness E, where the particles are oriented in the plane "a-t" (geometrical form obtained during the second, horizontal compression, with the male dies 7 and 7').

FIG. 11*a* and 11*b* relate to the brushes of Example 2. They represent sections through brushes along the plane "r-t", with FIG. 11*a* relating to a brush according to the prior art with homogeneous anisotropy, and FIG. 11*b* relating to a brush according to the invention. In this brush according to the invention, the "core" of the brush is formed of particles contained in the plane "a-t", while within a thickness E of two opposite faces of the brush, the particles are oriented in the plane "r-a".

FIG. 12, a section along the plane "r-t", shows a brush of Example 3 according to the invention, with the initial powder batch (9) being different for the head (19) (represented by x's) and for the remainder of the brush.

FIGS. 13*a*–13*c* and 14*a*–14*b* represent apparatus intended to form brushes of trapezoidal cross section.

Figure 13A:
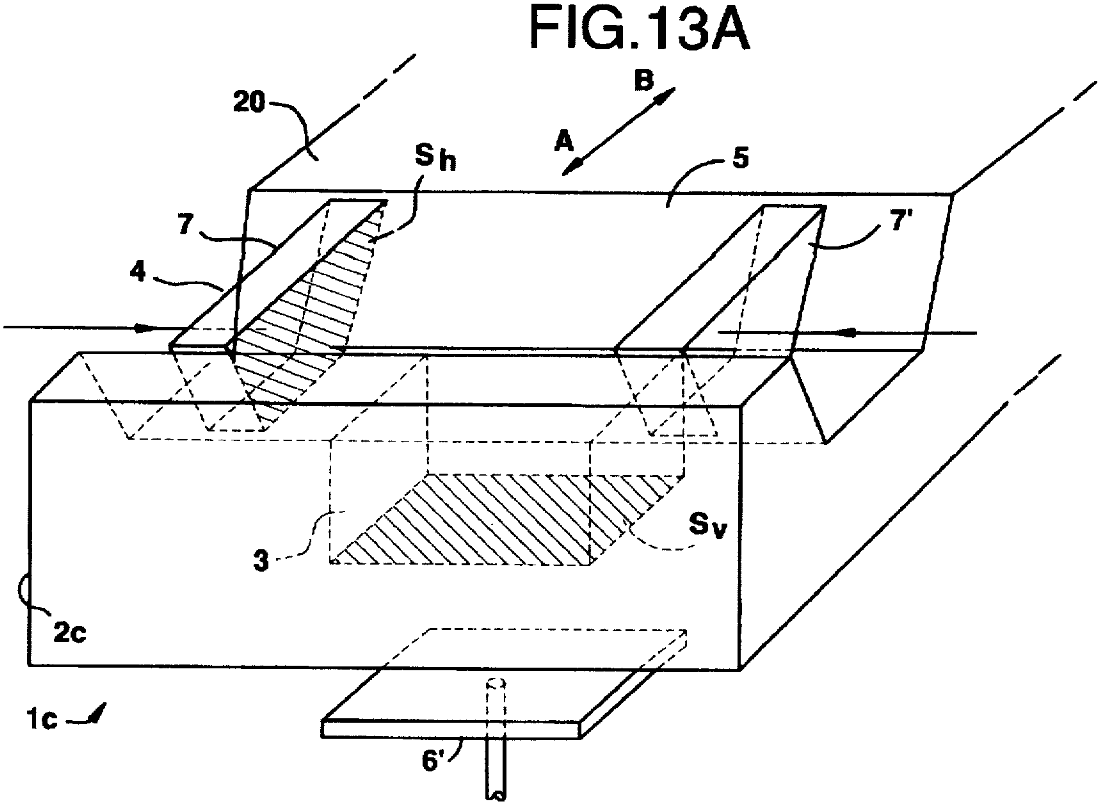
FIGS. 13*a*–13*c* are views of a variation of the apparatus of the invention.
Figure 13B:
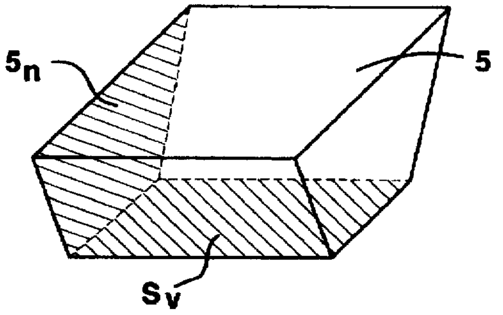
Figure 13C:
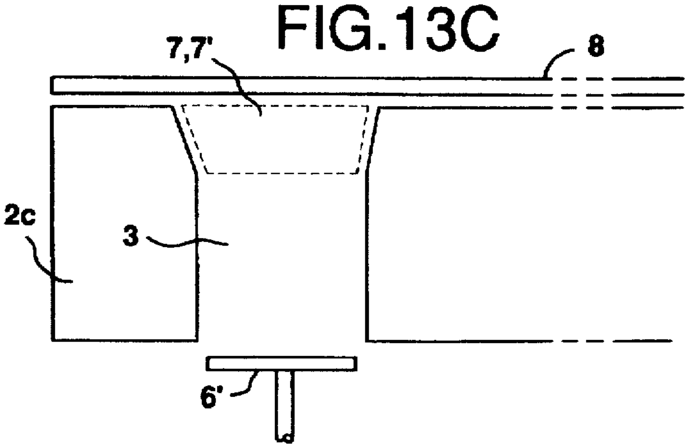

In the case of FIGS. 13*a*–13*c*, the horizontal male dies (7, 7') have a trapezoidal cross section, and the parallel sides of this trapezodial cross section are located in the horizontal plane. Compression in the vertical direction is assured by the vertical lower male die (6'), of rectangular cross section, and the upper plate (8).

FIG. 13*a* is a schematic perspective view, similar to FIGS. 1, 3 and 6, of an apparatus (1*c*) including a female die (2*c*) whose horizontal sheath (4) has a trapezoidal cross section.

FIG. 13*b* shows what is called the common volume (5), which takes the shape of a right-angled prism with a trapezoidal base.

FIG. 13*c* is a section view through the apparatus (1*c*) of FIG. 13*a*, in a vertical plane passing through the points (A-B).

Figure 14A:
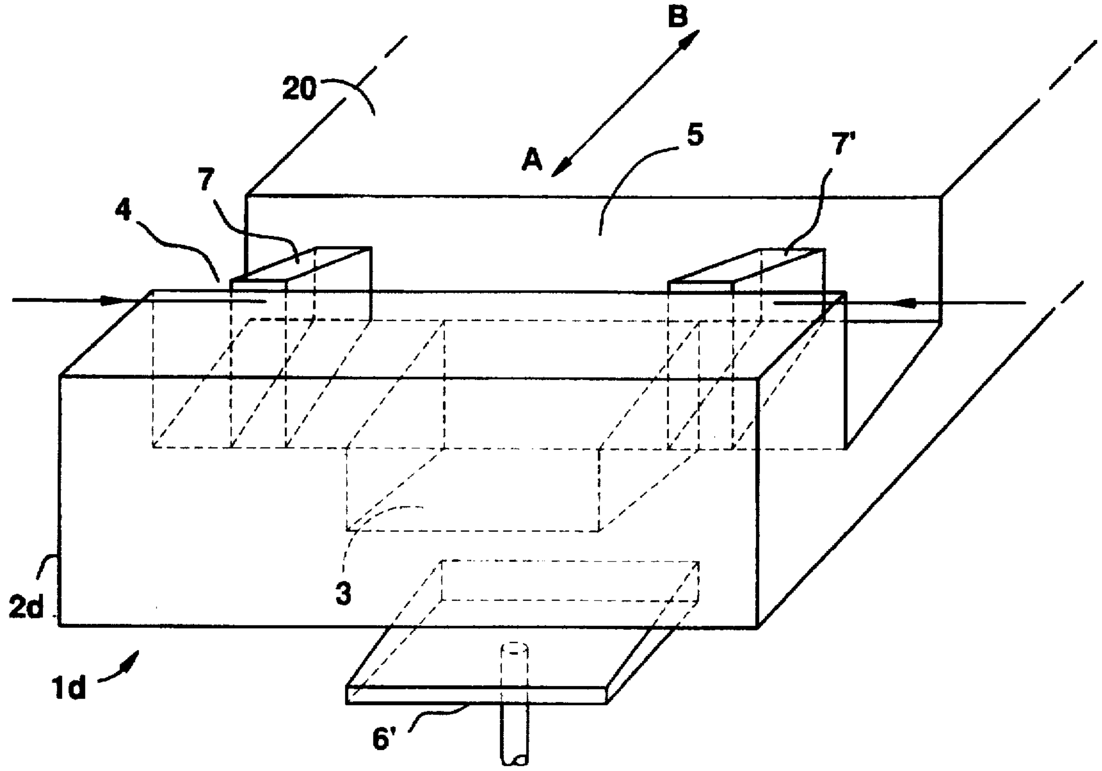
FIGS. 14*a* 14*b* are views of another variation of the apparatus of the invention.
Figure 14B:
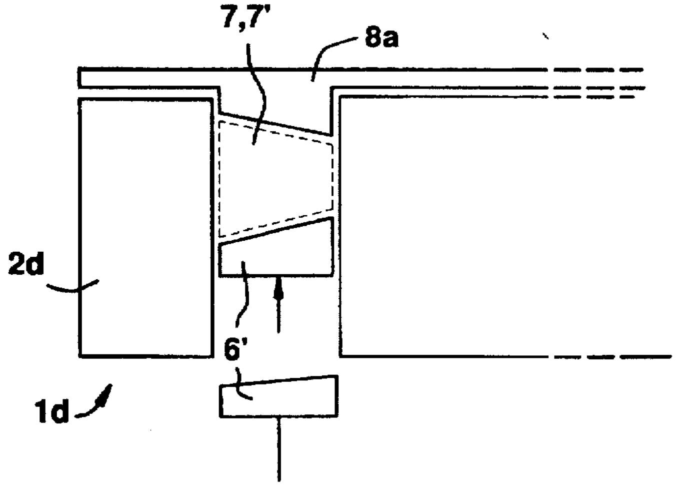

FIG. 14*a* is similar to FIG. 13*a*, except that the horizontal sheath (4) has a trapezoidal cross section whose parallel sides are in the vertical plane. Consequently, the lower vertical male die (6') and the upper plate (8) are provided with inclined portions intended to cooperate with the intersecting sides of this trapezoidal cross section, as shown in FIG. 14*b*, which is a section through the apparatus (1*d*) of FIG. 14*a*, in a vertical plane and in the direction (A-B) of FIG. 14*a*.

DETAILED DESCRIPTION OF THE INVENTION

In the invention, the vertical (3) and horizontal (4) sheaths preferably have rectangular, square or trapezoidal cross sections $S_v$ and $S_h$, respectively, which join to make a common volume (5) resulting preferably from the orthogonal projection of the cross sections $S_v$ and $S_h$—see FIGS. 1, 3, 6, 14*a*; FIG. 13*a* illustrates the case where the common volume (5) is not, in the strict sense, the result of the orthogonal projection of the cross sections $S_v$ and $S_h$, because the vertical sheath (3) has a constant cross section $S_v$ in the lower portion of the female die (2*c*) serving to guide the male die (6'), a cross section which then becomes wider at the level of this common volume.

The common volume (5) is a rectangular parallelepiped, when the cross sections $S_v$ and $S_h$ are rectangular or square (FIG. 1). This volume (5) is a right prism with a trapezoidal base when one of the cross sections $S_v$ or $S_h$ is a trapezoid (FIG. 13*b*).

However, in the case where a brush is manufactured including a notch (15), as shown for the brush of FIG. 8*c*, a manufacturing apparatus can be used that is provided with a right-hand horizontal male die (7') that has only the cross section of the notch (15) to be obtained.

In the first preferred embodiment of the invention relating to the vertical compression, illustrated in FIGS. 3, 4*a*–4*c*, 5*a* and 5*b*, 6, 7*a*–7*c*, the means of compression in the vertical direction is formed by this vertical sheath (3), provided in its lower portion with a male compression die (6') and in its upper portion with a movable plate (8) whose surface area is greater than the cross section $S_v$ of the vertical sheath.

This plate (8) is displaced during the phase of charging the cavity with the powder (9) to be compressed, which powder occupies a useful volume Vo of the T-shaped cavity, and then after this powder has been charged, it is placed on the upper surface (20) of the female die and kept pressed against it with the aid of means known to the art and not shown (typically, one or more hydraulic jacks exerting a pressure greater than that exerted by the vertical lower male die (6')).

In a second embodiment of the invention relating to the vertical compression, illustrated in FIGS. 1, 2*a*–2*d*, the means of compression in the vertical direction is formed by the vertical sheath (3), provided with a male compression die (6') in its lower portion and another male compression die (6) in its upper portion, so that it can exert a bidirectional compression along the vertical axis. With respect to the compression along the horizontal axis, the invention also contemplate two embodiments.

In a first embodiment relating to the horizontal compression, as shown in FIGS. 1, 2*a*–2*d*, 3, 4*a* and 4*b*, 5*a* and 5*b*, the horizontal sheath (4) is provided with two male compression dies, that is, a left-hand male die (7) and a right-hand male die (7'), in such a way that it can exert a bidirectional compression along the horizontal axis. As has already been noted, this kind of bidirectional compression is highly useful in order to lend the head and foot of the brush a particular geometrical configuration, for example that of the brushes shown in FIGS. 8*c* and 8*d*.

In a second embodiment relating to horizontal compression, as shown in FIGS. 6, 7*a*–7*b*, the horizontal sheath (4) is provided on one end with a single male die (7'), while its other end is formed by part of one of the walls of the vertical sheath (3).

In these drawing figures, the cavity whose useful volume is Vo containing the powder (9) to be compressed takes the form of an L, and the apparatus shown in FIGS. 6, 7*a*–7*b* includes only two male dies.

According to the invention, the upper plate (8) can also be replaced with a male die (6) and can thus obtain a cavity of useful volume Vo containing the powder (9) to be compressed, which cavity is in the form of an inverted T.

It is advantageous according to the invention that this movable plate (8) not only serves to close the upper portion of the vertical sheath (3) but also, at the same time, forms the upper wall of the horizontal sheath (4). The value of this embodiment thus becomes quite apparent, since a single machining suffices to form a horizontal sheath (4) open in its upper portion and having precise dimensions—specifically a precise width 1. (See FIGS. 3 and 5*a*.)

Applicant has found that the apparatus according to the invention should advantageously include differentiated control of the means of compression in each direction. The compressing means of one sheath (3 or 4) are employed under displacement control, while the compressing means of the other sheath (4 or 3) are employed under control of the pressure exerted; the particular means for compression under displacement control and pressure control are known to the art. These two control means have been represented symbolically in FIG. 5*b*.

Preferably, as shown in FIG. 5*b*, the compressing means of the vertical sheath (3) are employed under displacement control, while these compressing means of the horizontal sheath (4) are employed under control of the pressure exerted. This is a preferred embodiment of the invention, which can simultaneously achieve all the objectives of the invention:

- to obtain a brush with definitive dimensions, which in all cases has a constant cross section with predetermined dimensions;

to obtain a brush compressed in the direction "t", to obtain a brush whose head and foot have a desired geometrical configuration.

In fact, the compression under displacement control sets the cross section of the brush and creates the desired anisotropy, while the compression under pressure control both forms the geometrical configuration of the head and foot of the brush, and constitutes the pressure complement necessary for the cohesion and mechanical performance of the brush.

A second object of the invention relates to a method of manufacturing brushes with the aid of an apparatus (1, 1*a*, 1*b*, 1*c*, 1*d*) as described above, including a female die with two sheaths, one vertical (3) and the other horizontal (4), each provided with at least one male die (6' and 7', respectively), forming a compression cavity of useful volume Vo, in which, so as to form an crude brush (11) with predetermined dimensions and favorably oriented anisotropy, a) with the compression means in the spaced-apart position, a batch (9) of volume ($V_o$), of at least one conductive powder is introduced into the cavity;

b) a first compression under displacement control is performed with the aid of compression means of one of the two sheaths (3 or 4), so as to obtain an intermediate tubular cavity of volume ($V_1$), having the cross section of the other sheath ((4) or (3), respectively), and to keep this cross section constant during the entire step (c) of second compression of the brush, so as to obtain an crude brush whose cross section is properly calibrated after step c);

c) a second compression under pressure control is performed with the aid of the compression means of the other sheath ((4) or (3), respectively), so as to obtain an crude brush (11) of final volume ($V_1$) with the desired final compression rate; and d) the compression means of each of the sheaths are moved apart from one another, first those under pressure control and then those under displacement control, and the crude brush (11) is ejected.

Displacement control of the vertical sheath compression means and pressure control of the horizontal compression means is a simple preference of a practical type, and a method in which the role of each sheath is reversed may be imagined.

The term "displacement control" is understood to mean that after the compression means of the vertical sheath have been set to motion, they stop as soon as the male die or dies have reached a certain dimension z (alignment in particular of the male die 6' with the edges of the horizontal sheath 4—see FIG. 5*b*).

The term "pressure control" is understood to mean that after the compression means for the horizontal sheath have been set in motion, they stop as soon as a certain predetermined pressure is reached.

For the reasons already given, it is desirable for the two compressions to be done in succession, and for the conductive powder to be compressed in a differentiated fashion for each compression. Hence the rate of initial compression Ti ($T_1=V_o/V_1$) attained by employing the compression means under displacement control is preferably between 1.5 and 3.5. Conversely, the complementary compression rate Tc ($T_c=V_1/V_f$) performed under pressure control is preferably between 1.1 and 2, and preferably the total compression rate $T_1$ ($T_1=T_1\times T_G$) is generally between 2.5 and 4, depending on the nature of the starting powders.

According to the invention, the anisotropy of a brush may be selected by varying the relative proportions of $T_1$ and $T_c$ to obtain the total compression rate $T_1$, the anisotropy of the brush being higher, the more the ratio $2\cdot(V_O-V_i)/(V_O-V_f)$ deviates from 1. In practice, it suffices for $T_i/T_i$ to be close to 1, or for $T_c/T_i$ to be greater than 0.5, for the desired anisotropy to be obtained.

In the most frequent case, $T_i/T_i$ is chosen to be near 1 (typically, between 0.7 and 0.95), so that the laminar structure and the proper cross section of the brush that are sought are obtained simultaneously, with the compression under pressure control ($T_c/T_i$ between 0.05 and 0.3) serving to obtain the desired geometrical configuration of the head and foot of the brush.

With the choice (by convention) of a horizontal compression under pressure control, the compression means of the horizontal sheath (4) are thus generally used, as shown in FIGS. 8*c* and 8*d*, to obtain the desired shape of the head (stub (14*a*), hole (15), etc.) and/or foot of the brush (curvature adapted to that of the collector, striped contact face).

One may also use the compression means of the vertical sheath (3) to provide the lateral walls of the crude brush with grooves/ribs (16*a*), as shown in FIGS. 6, 7*a* and 7*b*, where it can be seen that the upper plate (8), just like the lower vertical male die (6'), locally has an excess thickness (16) —but a hollow instead of a relief would also be possible— crosswise, in such a way that an crude brush (8*b*) is obtained that has lateral grooves (16*a*).

It is known to be advantageous to assemble the conductor (12) from the conductive powder during the first compression. Hence, any compression means according to the invention, but preferably the compression means employed under displacement control, may be used to incorporate the electrical connection conductor or any other object intended to be at least partly embedded in the powder to be compressed.

The invention also makes it possible to obtain brushes of differing localized densities. It is especially advantageous to have brushes whose heads have a "high" density, because this is favorable for the solidity of the assemblage of the conductor and the block of compressed powder, as well as brushes whose feet may have a "low" density, in such a way as to facilitate and speed up the phase of running in of the motor.

"High" or "low" density are understood to mean not an absolute density value but a deviation from the mean density $d_m$ of the brush. A "high" density is typically equivalent to a density of between 1.05 $\cdot d_m$ and 1.08 $\cdot d_m$. Conversely, a "low" density typically corresponds to a density of between 0.85 $\cdot d_m$ and 0.95 $\cdot d_m$.

Such a brush can be obtained with a method that uses the apparatus (1*b*) of FIG. 6, in which the horizontal sheath (4) is provided on one end with only a single male die (7'), while the other end is formed by a portion of one of the walls of the vetical sheath (3). In this method, at the time of the compression under displacement control of the batch (9) of at least one conductive powder of volume Vo, the mean initial compression rate $T_i$ is chosen to be equal to at least 2, and less than 0.9 $T_i$.

Hence, Applicant has observed that with a relatively high rate of first compression under displacement control, the second compression, which as already indicated enables the geometrical configuration of the head and foot of the brush, also makes it possible, thanks to a compression by a single male die (7') of the compressed powder block (10), to obtain an crude brush (11) that is denser on the side of the second male compression die than on the opposite side, as schematically shown in FIG. 8*e* (with more closely-spaced shading on the "head" end (19) than on the other "foot" end (18)). Applicant has interpreted these results by assuming that, while the block of compressed powder generally contains graphite powders with a low coefficient of friction, nevertheless beyond a certain initial compression rate Ti, the complementary compression Tc acts "locally" and hence does not have homogeneous repercussions on the entire compressed powder block (10).

A third object of the invention is brushes which are manufactured with the aid of the apparatus and methods of the invention. Brushes obtained with the apparatus and methods of the invention are characterized by the heterogeneity of their anisotropy, between the "core" of the brush and two of the six faces of the brush (on the order of a few millimeters, within most, at a thickness E): the orientation of the particles in the "core" of the brush is 90° from the orientation of the particles of two of the six faces of the brush.

Typically, the "core" particles are oriented in the plane "a-r", and the particles of the head (19) and foot (18) are oriented in the plane "a-t". See FIGS. 10*b* and 10*c*, for example. The situation may also be reversed, however, with a "core" having particles oriented along the plane "a-t", and two faces of the brush, within a thickness E, having particles oriented along the plane "a-r" (or "t-r"), as shown in FIG. 11*b*.

Most often, the head (19) and the foot (18) are provided with geometric means (curvature, stubs, holes, etc.) that are adapted for the use of these brushes, and that are obtained according to the invention directly in the course of the biaxial compression step.

EXAMPLES

The following examples describe only the formation of crude brushes (11), with the other steps in the manufacture of brushes, in particular baking of the crude brushes, being known to the art and not being specific to the invention.

EXAMPLE 1

Brushes were made for auxiliary electric motors for vehicles, typically the window-raising motor, with the aid of the biaxial compression apparatus of the invention (1*a*) shown in FIGS. 3, 4*a*–4*c*, from the usual powders including particles of graphite in the form of flakes, particles of large dimension (from 30 to 300 μm) but small thickness (less than 20 μm). The dimensions of these brushes are 5 mm×5 mm×11 mm.

FIG. 9 shows various views of these brushes. The foot (18) of the brush has a curvature, and the concave contact surface (13) has oblique grooves (23). The head (19) of the brush has a hole (15) intended for centering the spring of the brush (not shown). The foot (18) and the head (19) are obtained due to the corresponding geometrical shape of the horizontal male dies on the left (7) and right (7') of the biaxial compression apparatus (1*a*).

Three series of comparative tests were performed, numbered 1*a*, 1*b* and 1*c*. In FIGS. 10*a*–10*c*, respectively, the configuration of the same volume Vo of the batch of powder (9) to be compressed is shown, for obtaining an crude brush (11) of the same final volume Vf.

The successive compression rates are shown in the following table: along the vertical axis (ti=Vo/Vi), then along the horizontal axis (Tc=Vi/Vf), with the total compression rate (ti•Tc) being the same in each of the cases, i.e., being equal to 3.

| Test | Ti | Tc | Ti/Tc | Ti · Tc | Remarks |
|---|---|---|---|---|---|
| 1a | — | 3 | — | 3 | Prior art |
| 1b | 1.5 | 2 | 0.75 | 3 | Per Invention |
| 1c | 2.5 | 1.2 | 2.08 | 3 | Per Invention |

Results obtained:

First, the texture of the brushes obtained was examined. For this, the orientation of the particles of the final crude brush (11), revealed by micrographic study of sections, is shown for each of the FIGS. 10*a*–10*c*.

It was observed that the brush (11) of test 1*a*, corresponding to the prior art and including only one compression in the horizontal axis, is homogeneous and anisotropic, with the particles oriented in the plane "a-t" perpendicular to the direction of compression Tc along the horizontal axis.

In the case of the brush (11) of test 1*b*, according to the invention, it was observed that the brush is homogeneous and anisotropic, with the particles oriented in the plane "a-r" perpendicular to the direction of compression Ti (along the vertical axis), except for a thickness E of approximately 2 mm at the ends of the brush, at the head (19) and foot (18), where the particles are oriented in the plane "a-t", which is perpendicular to the direction of compression Tc (along the horizontal axis).

In the case of test 1*c*, the results obtained were similar to those of test 1*b*, except that the thickness E is about 1 mm, instead of 2 mm for test 1*b*.

In addition, the brushes were tested on the test bench. It was possible to verify the superiority of commutation of the brushes of the invention (1*b* and 1*c*), compared with the brushes of the prior art (1*a*).

EXAMPLE 2

Brushes (11) were manufactured with a conductor (12) fixed along the axis "r" of the brush, as shown in FIGS. 11*a* and 11*b*. For this example, the same biaxial compression apparatus 1*a* was used as that used in Example 1. The mixture of powders to be compressed included, besides graphite powder, copper powder (40% by volume).

| Test | Ti | Tc | Ti/Tc | Ti · To | Remarks |
|---|---|---|---|---|---|
| 2a | 3 | — | — | 3 | Prior art |
| 2b | 1.5 | 2 | 0.75 | 3 | Per invention |

As in the case of Example 1, the orientation of the particles at the end of the compression was observed and has been shown in FIGS. 11*a* and 11*b*. It was observed that in the case of the control test 2*a* of the prior art (see FIG. 11*a*), the particles are oriented uniformly in the plane perpendicular to the direction of compression (vertical compression–Ti=3). Conversely, in the case of test 2*b* of the invention (see FIG. 11*b*), it is observed that the "core" of the brush has an orientation of the particles in a plane perpendicular to the first compression (vertical compression– Ti=1.5), while "the skin" of the brush, within a thickness E of approximately 2 mm, has an orientation of the particles in a plane perpendicular to "t" and to the direction of the complementary compression (horizontal compression–Tc=2).

The relative resistivities R were measured, in the direction "r" (Rr) and in the perpendicular direction "t", for the brushes (2*a*) and (2*b*):B

| | Brush 2a | Brush 2b |
|---|---|---|
| Rr/Rt | Close to 3 | Close to 1 |

Tests of these brushes on the test bench demonstrated the commutation superiority of the brushes 2*b* of the invention.

EXAMPLE 3

Brushes were manufactured for motors intended for portable tools. For this purpose, the biaxial compression apparatus (1*a*) used for Examples 1 and 2 was used.

A batch of starting powder (9) of volume VO was introduced, formed by the simultaneous introduction of two batches of powder of different types—as described in French Patent Application No. 93-06962. In particular, one batch intended to form the head (19) of the brush, rich in copper powder (more than 50% by volume) was introduced, along with a batch intended to form the wear block (25) of the brush, which was rich in graphite powder, the compositions of these batches being known to the art.

For test 3*a*, Ti was chosen to be equal to 2.5 and Tc was chosen to be equal to 1.2. The brush shown in FIG. 12 was obtained. The head (19), which includes a stub (14*a*) for centering the spring, is relatively isotropic (represented by crosses in FIG. 12). The wear block (25) of the brush (11) is essentially constituted of an anisotropic material (particles oriented in the plane "r-a"), except for the end (foot (18)), where at a thickness E of material, the orientation of the particles is in the plane "a-t".

Compared with the brushes of the preceding examples, this brush is advantageous because it assures very good electrical contact (low ohmic drop) between the conductor (12) and the head (19) of the brush.

For one skilled in the art of brushes, who is accustomed to suffering the consequences of uniaxial compression in terms of anisotrophy and orientation of the particles, or who is accustomed to employing complimentary machining steps to obtain brushes that have the desired geometric means, the invention, if not revolutionary, at least provides the essential ability to simultaneously control the desired orientation of the particles of the brush, the geometrical configuration, especially of the head and foot of the brush, and costs.

The multiple drawing figures and examples are to illustrate by way of examples the great breadth of the invention.

The invention makes possible the economical manufacture of a large variety of brushes, with the most diverse geometric shapes and anisotrophies, making it the tool desired by the brush manufacturer, who must constantly improve his products and adapt them to meet new demands.

What is claimed is:

1. A method of manufacturing a brush having a head portion and a foot portion, comprising the steps of:

a) providing a female die with two sheaths intersecting 90° from each another, one said sheath vertical and the other said sheath horizontal, each said sheath provided with at least one male die, said sheaths forming a compression cavity of useful volume ($V_o$);

b) with the compression means spaced-apart, introducing a batch of volume ($V_o$), of at least one conductive powder into said cavity;

c) performing a first compression under displacement control using compression means of one of the two sheaths, so as to obtain an intermediate tubular cavity of volume ($V_i$), having the cross section of the other sheath, and to keep this cross section constant during a second compression of the brush, in such a way as to obtain an crude brush having a cross section properly calibrated after a second compression;

d) performing a second compression under pressure control using the compression means of the other sheath so as to obtain a crude brush of final volume ($V_f$) with the desired final compression rate;

e) moving the compression means of each of the sheaths apart from one another, first those under pressure control and then those under displacement control, and ejecting the crude brush, thereby forming a crude brush of predetermined dimensions and favorably oriented anisotropy, wherein the compression under displacement control initially has a mean rate $T_i=V_o/V_i$ between 1.5 and 3.5, and wherein the compression under pressure control has a rate $T_o=V_i/V_f$ between 1.1 and 1.2, and wherein there is a total compression rate $T_f=T_i \times T_{Tc}$ between 2.5 and 4, depending on the nature of the at least one conductive powder.

2. The method of claim 1 wherein, the compression means of the vertical sheath are employed under displacement control, and the compression means of the horizontal sheath are employed under pressure control.

3. The method of claim 2, wherein the compression means of the horizontal sheath are used to obtain the desired shape of the head and/or the foot of the brush.

4. The method of claim 2, wherein the compression means of the vertical sheath are used to provide lateral walls of the crude brush with grooves or ribs.

5. The method of claim 2, additionally comprising the steps of:

a) providing an apparatus in which said horizontal sheath is provided on one end with a single male die, the other ends being formed by a portion of one of the walls of the vertical sheath;

b) during the compression under displacement control of said mixture of powders, selecting said initial mean compression rate ($T_i$) to be at least equal to 2 and less than 0.9 $T_r$, thereby forming a crude brush having one end denser than the other.

6. The method of claim 1, comprising selecting the anisotropy of the brush by varying the relative proportions of $T_i$ and $T_c$ to obtain the total compression rate $T_r$, the anisotropy of the brush being higher, the more the ratio $2.(V_o-V_i)/(V_o-V_f)$ deviates from 1, where either $T_i/T_t$ or $T_c/T_t$ is close to 1.

7. The method of claim 1, wherein one said compression means is used to incorporate one end of an electrical connection conductor, or any other object intended to be at least partly embedded in the powder to be compressed.

* * * * *

UNITED STATES PATENT AND TRADEMARK OFFICE

CERTIFICATE OF CORRECTION

PATENT NO. : 5,626,803

DATED : May 6, 1997

INVENTOR(S) : HORST SIEGEMUND

It is certified that error appears in the above-indentified patent and that said Letters Patent is hereby corrected as shown below:

Column 1, line 38, change "L" to --t--.

Column 6, line 34, change "FIG. 8c" to --FIG. 8e--.

Column 9, line 26, Change "$V_1$" to --$V_i$--;
line 35, change "$V_1$" to --$V_f$--;
line 60, change "$T_1=V_o/V_1$" to --$T_i=V_o/V_i$--;
line 63, change "$T_c=V_1V_f$" to --$T_c=V_i/V_f$--; and
line 65, change "$T_1(T_1=T_1xT_G)$" to --$T_t(T_t=T_ixT_c)$--.

Column 10, line 2, change "$T_1$" to --$T_i$--;
line 3, change $T_1$" to --$T_t$--;
line 5, change "$T_i/T_i$" to --$T_i/T_t$--;
line 6, change "$T_c/T_i$" to --$T_c/T_t$--;
line 8, change "$T_i/T_i$" to --$T_i/T_t$--;
line 12, change "$T_c/T_i$" to --$T_c/T_t$--; and
line 60, change "$T_i$" to --$T_t$--.

Column 11, line 17, change "millimeters, within most, at a thickness E" to --millimeters, at most, within a thickness E--; and line 66, change "ti" to --Ti--;

Column 12, line 1, change "ti" to --Ti--;
line 47, change "Ti.To" to --Ti.Tc--.

UNITED STATES PATENT AND TRADEMARK OFFICE

CERTIFICATE OF CORRECTION

PATENT NO. : 5,626,803

DATED : May 6, 1997

INVENTOR(S) : HORST SIEGEMUND

It is certified that error appears in the above-indentified patent and that said Letters Patent is hereby corrected as shown below:

IN THE CLAIMS:

Column 14, line 24, change "$T_o=V_i/V_f$" to --$T_c=V_i/V_f$--;

Column 14, line 25, change "$T_t=T_ixT_{Tc}$" to --$T_t=T_ixT_c$--.

Signed and Sealed this

Ninth Day of September, 1997

Attest:

BRUCE LEHMAN

*Attesting Officer*

*Commissioner of Patents and Trademarks*